Jan. 4, 1966 T. BUDZICH ETAL 3,227,235
POWER DRIVE TO MAINTAIN CONSTANT FORCE
BETWEEN TRACTOR-TRAILERS
Filed Nov. 14, 1962 7 Sheets-Sheet 1
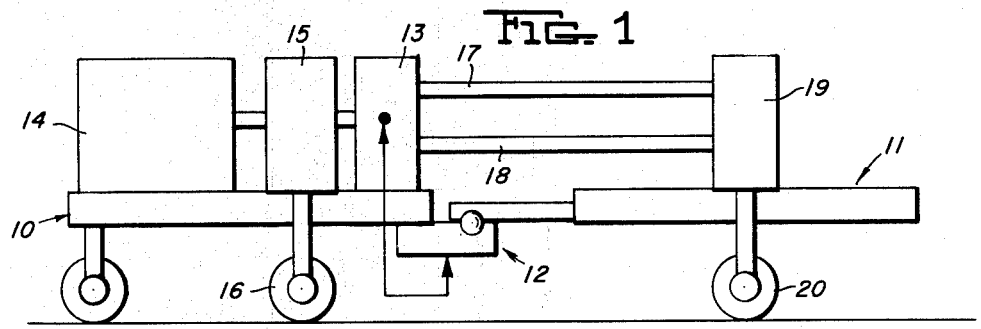
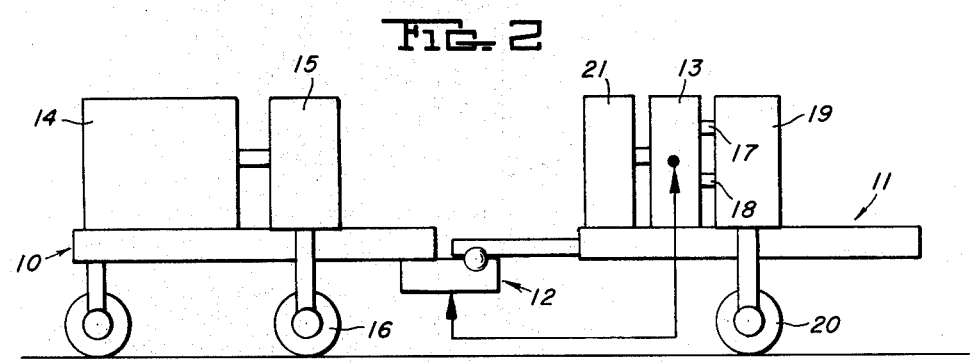
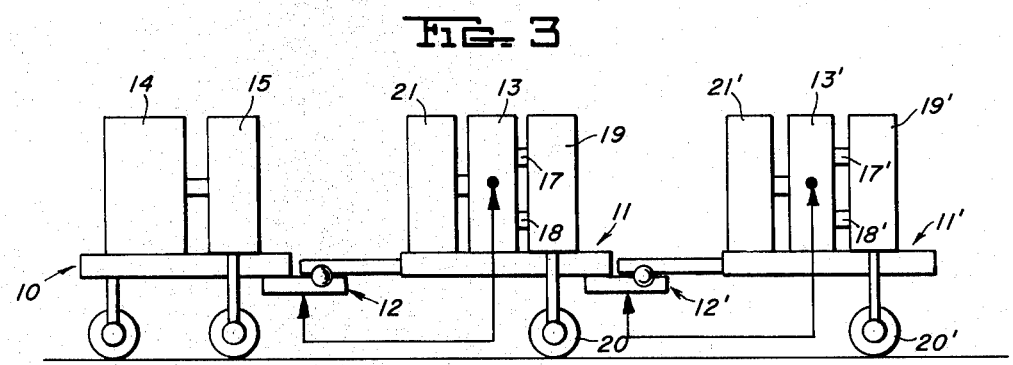
INVENTORS
TADEUSZ BUDZICH
ARNOLD PITT Jan. 4, 1966
T. BUDZICH ETAL
3,227,235
POWER DRIVE TO MAINTAIN CONSTANT FORCE
BETWEEN TRACTOR-TRAILERS
Filed Nov. 14, 1962
7 Sheets-Sheet 2
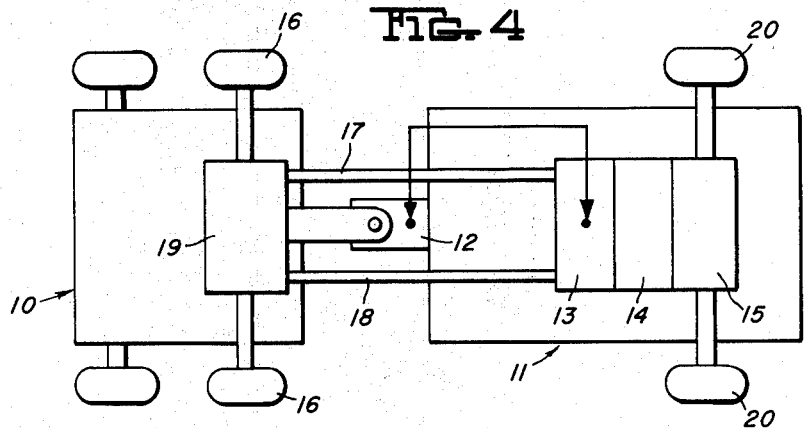
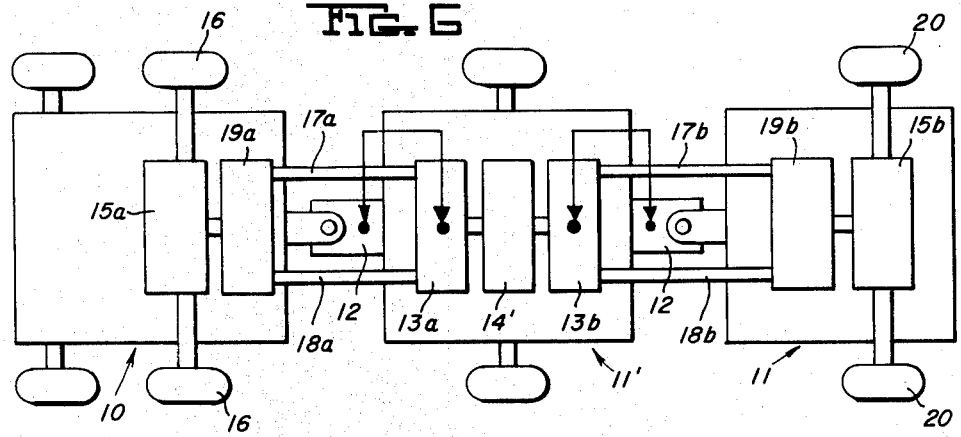
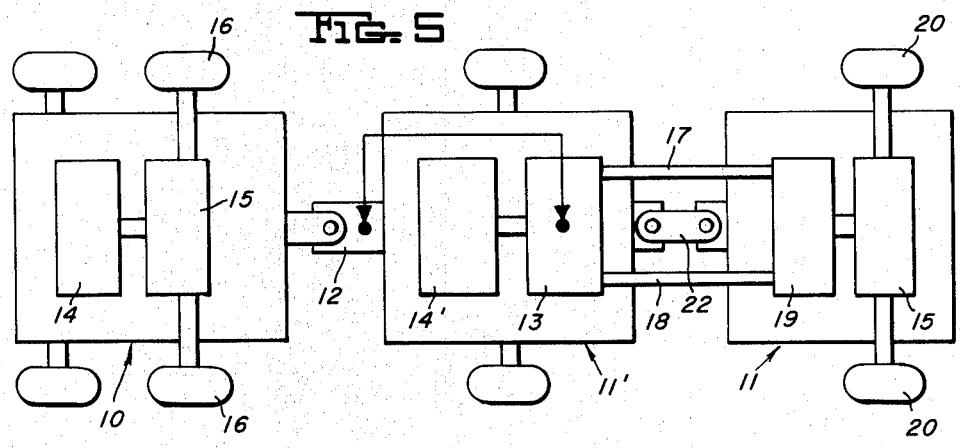
INVENTORS
TADEUSZ BUDZICH
ARNOLD PITT

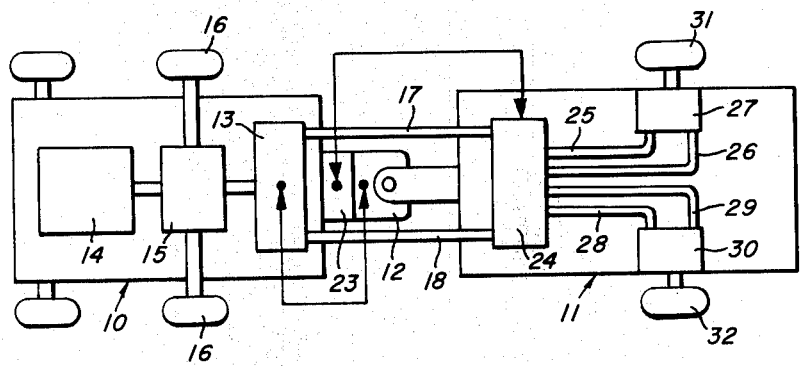
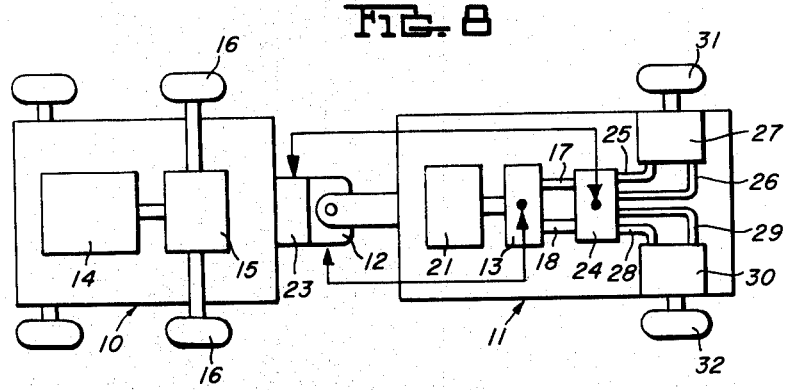
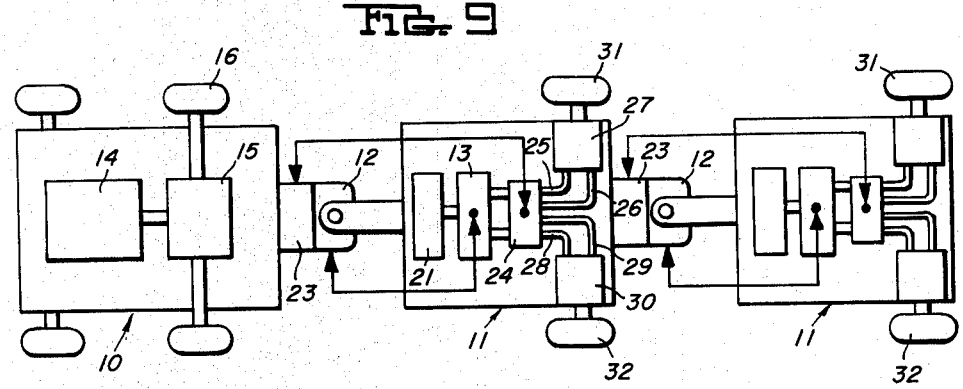

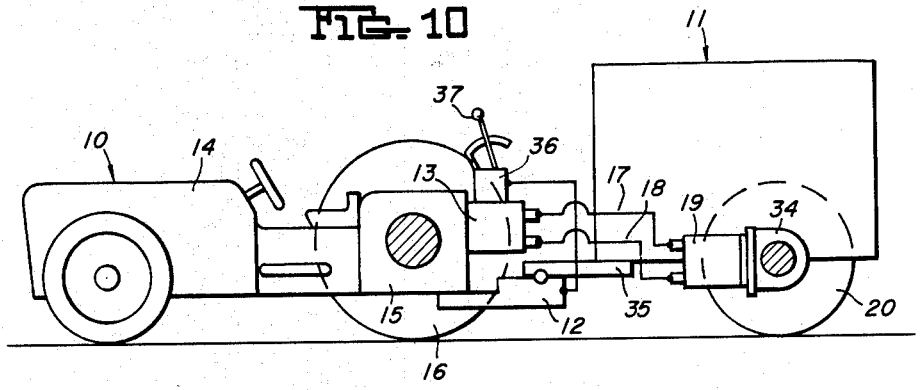
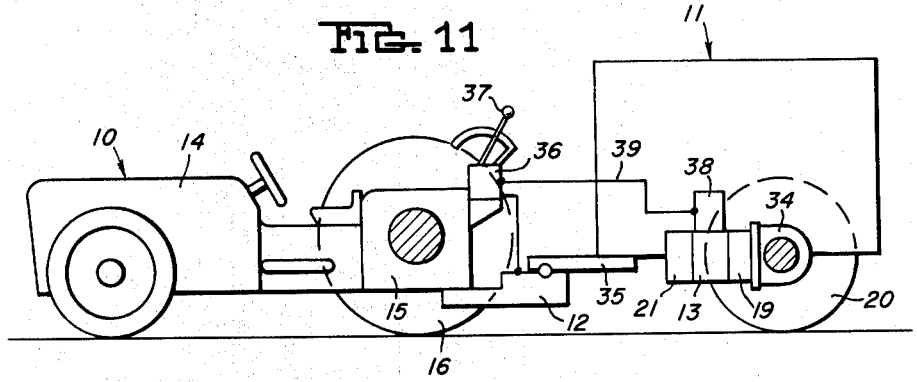
INVENTORS
TADEUSZ BUDZICH
ARNOLD PITT

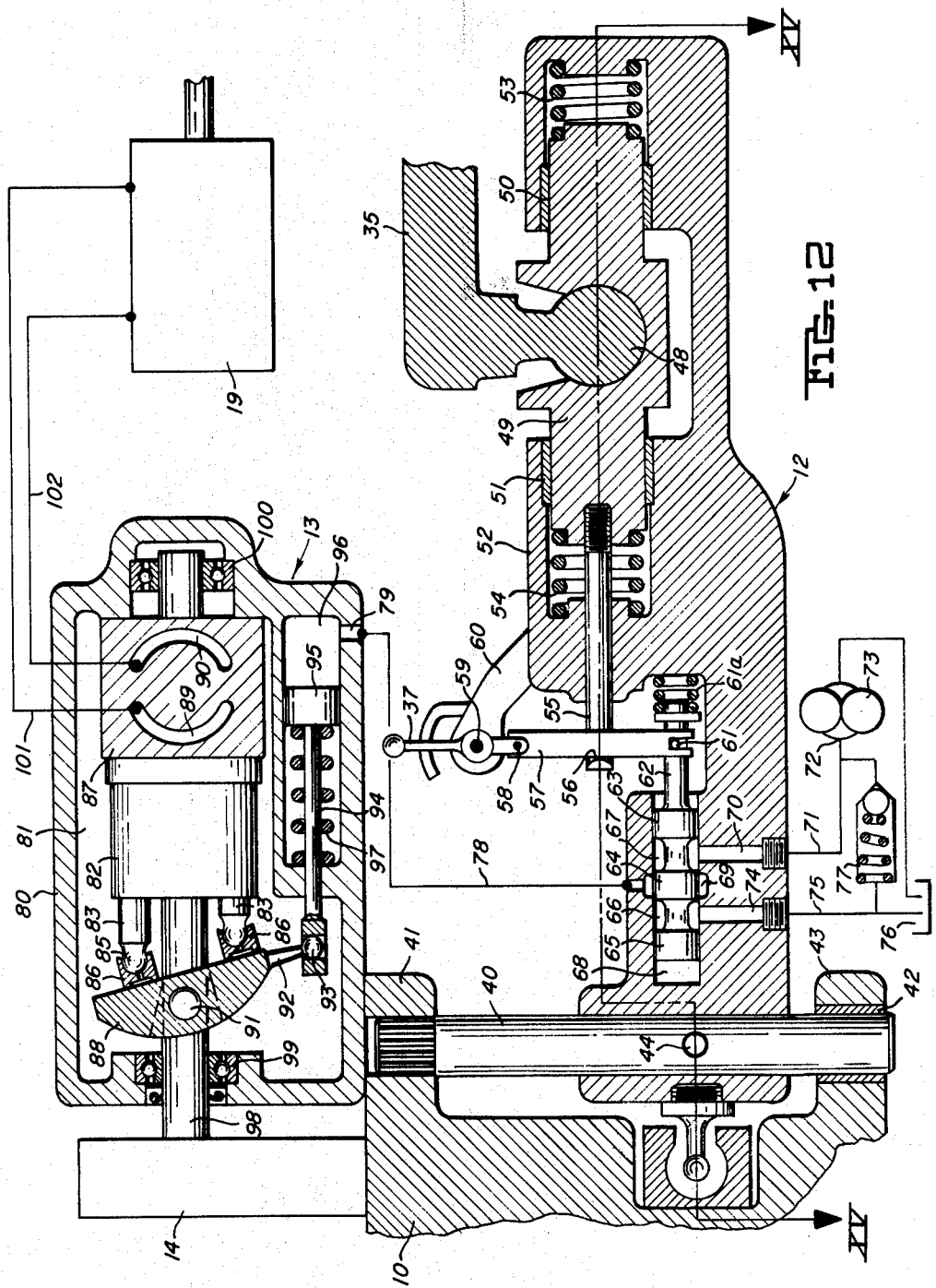

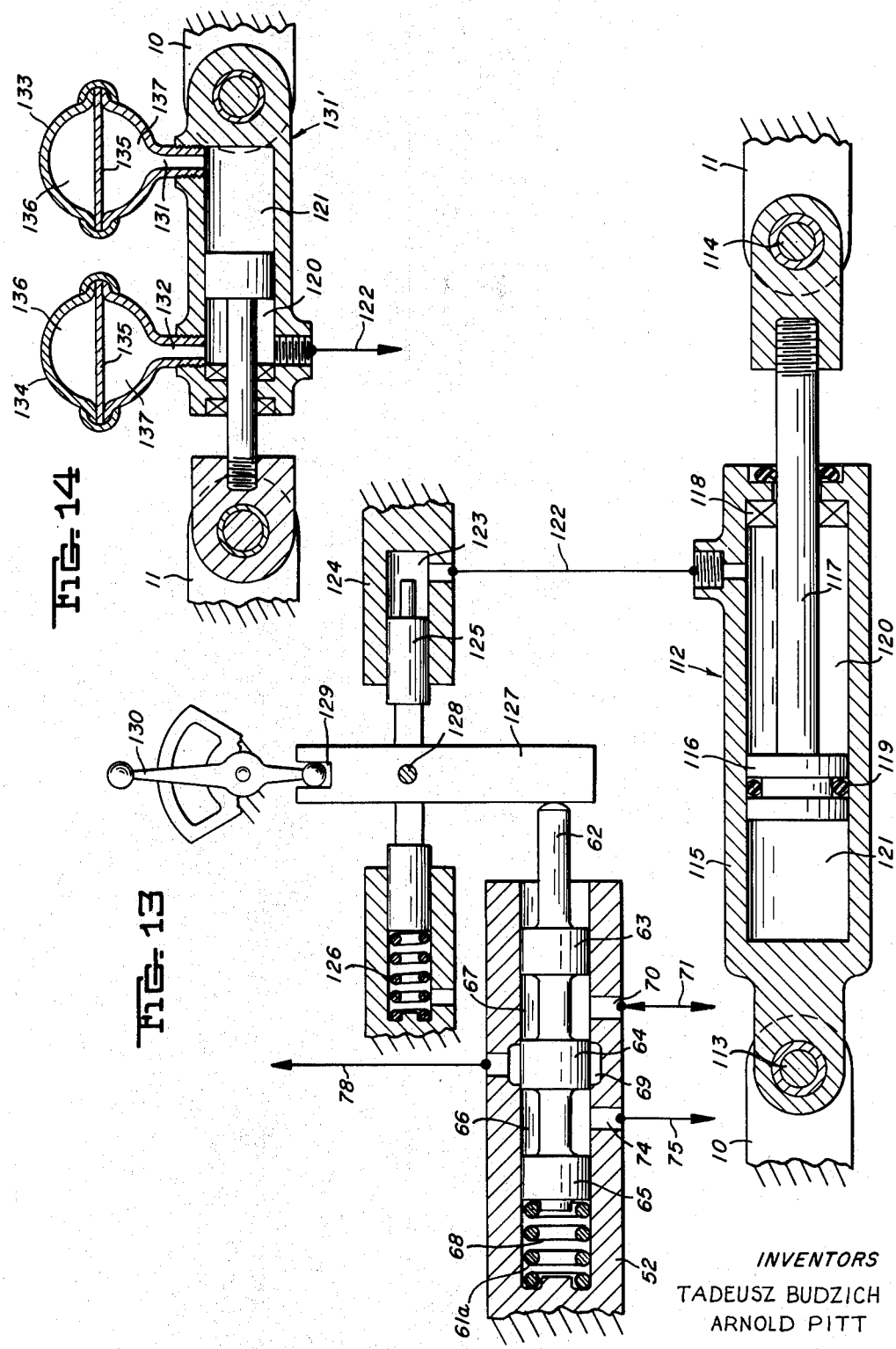

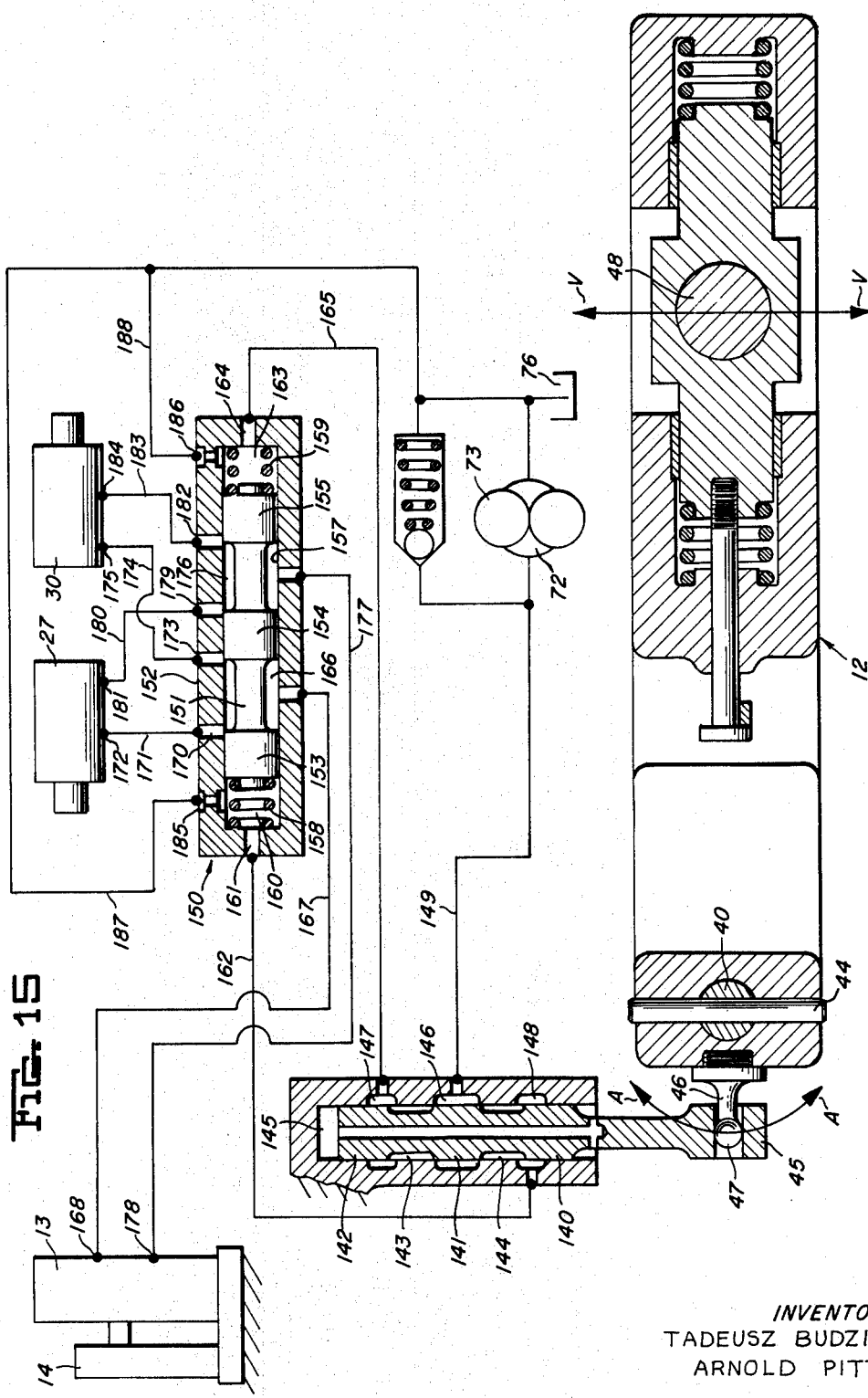

United States Patent Office 3,227,235
Patented Jan. 4, 1966

3,227,235
POWER DRIVE TO MAINTAIN CONSTANT FORCE BETWEEN TRACTOR-TRAILERS
Tadeusz Budzich, 3344 Colwyn Road, Cleveland 20, Ohio, and Arnold Pitt, 5 Hillgarden Road, Weston, Ontario, Canada
Filed Nov. 14, 1962, Ser. No. 238,079
35 Claims. (Cl. 180—14)

This invention relates generally to power drives of coupled loads and has a particular significance in connection with power drives of tractor-trailer arrangements.

In more particular aspects this invention relates to fluid drives, transmitting power from a guiding vehicle to a guided vehicle.

In still more particular aspects this invention relates to controls of fluid power drives, for coupled loads, in which a constant preselectable force relationship is maintained between the loads.

According to prior art teaching, trailers were either directly pulled through a draw bar, attached to the guiding vehicle, or the power plant of the tractor was suitably connected through shafts, universal joints and differentials to the wheels of the trailer. Both of those methods suffered from serious disadvantages. In the case of an unpowered, towed trailer, the guiding vehicle had to be unnecessarily heavy to provide the required tractive effort. This arrangement was quite unsatisfactory during braking and produced the well-known tendency of jack-knifing, when operating in reverse, or when the tractor was braked without similar braking of the trailer. In the case of a powered trailer, although the weight of the towed load was utilized to augment the combined tractive effort, other parasitic effects were introduced. The trailer drive was expensive and synchronization of tractor-trailer power drives difficult. During braking, a load in excess of surface friction grip of the guiding vehicle coud be transferred through the draw bar from the trailer, resulting in a loss of full steering control of the units.

It is therefore a principal object of the present invention to provide an improved power drive for coupled loads.

Another object of this invention is the provision of a fluid power drive responsive to a control, which will maintain a preselectable constant force between the guiding vehicle and the guided vehicle, when operating either in forward or reverse directions.

Still another object of this invention is to provide a fluid power drive, which will automatically adjust its ratio to maintain a constant preselectable draw bar force vector between the guiding vehicle and the guided vehicle automatically eliminating the steering forces in a horizontal plane, transmitted from the trailer to the tractor.

Still another object of this invention is to provide a fluid power drive readily detachable from the guided vehicle and from the power plant of the guiding vehicle.

Still another object of this invention is the provision of fluid drives and controls which permit a number of trailers to be guided by a single vehicle, while the draw bar pull is preselectable and constant between each trailer, with trailers driven both in forward and reverse directions.

Yet, a further, more general object of this invention is the provision of fluid drives and controls for coupled loads which will provide powered operation of each of the loads at automatically controlled force levels between the loads. Other objects and advantages of the present invention will become apparent from the following description, reference being had to the accompanying drawings in which:

FIGURES 1, 2, 3, 4, 5 and 6 are schematic representations showing drives for a guiding vehicle and a powered trailer for maintaining a constant force relationship along axis of applied traction effort, between the guiding vehicle and the trailer;

FIGURES 7, 8, and 9 are schematic representations of drives of a guiding vehicle and powered trailer, incorporating controls which maintain a constant force relationship along axis of applied traction effort, between the guiding vehicle and the trailer for eliminating steering forces in a horizontal plane, between the guiding vehicle and the trailer;

FIGURE 10 is a diagram showing, schematically, the arrangement of FIGURE 1 in greater detail as applied to a tractor;

FIGURE 11 is a diagram showing, schematically, the arrangement of FIGURE 2 in greater detail as applied to a tractor;

FIGURE 12 is a diagrammatic sectional view of a variable displacement pump and the force sensing mechanism and control;

FIGURE 13 is a diagrammatic sectional view of another embodiment of the force sensing mechanism and control;

FIGURE 14 is a diagrammatic sectional view of yet another embodiment of the force sensing mechanism; and FIGURE 15 is a diagrammatic sectional view taken substantially along line 15—15 of FIGURE 12 and showing a steering force sensing mechanism and control.

Referring now to the drawings, and particularly to FIGURE 1, a guiding vehicle and a powered trailer are schematically illustrated and generally designated as 10 and 11 respectively. The guiding vehicle 10 and trailer 11 are universally connected by a force sensing mechanism designated generally as 12. A variable displacement hydraulic pump 13 is mounted on the guiding vehicle 10 and drivingly connected to a variable speed prime mover 14, through a conventional drive 15 which in turn drives traction wheels 16. The variable displacement pump 13 is connected through conduits 17 and 18 to a hydraulic motor 19, mounted on the trailer 11. The motor 19 is drivingly connected to wheels 20 of the trailer 11. As will be explained presently, the force sensing mechanism 12 is adapted to deliver a control signal to the variable displacement pump 13 for the purpose of adjusting its volume output so it will feed sufficient power into fluid motor 19, to maintain a constant force between the guiding vehicle 10 and trailer 11. Any variation of the speed of the guiding vehicle 10, resulting in a change in the force transmitted to load 11, or any change in the traction resistance of the load 11, is sensed in a manner which will be described by the force sensing mechanism 12. A change in this force will result in a signal which will change the power and torque developed in the variable displacement pump and fluid motor circuit, to maintain a constant force relationship between the guiding vehicle 10 and the load 11. This constant force relationship will be maintained when moving both in forward and reverse directions and when accelerating and braking, by an automatic control translating the signal from the force sensing mechanism 12 into equivalent displacement of pump 13, which is hereinafter described in detail.

FIGURE 2 is similar to FIGURE 1 with the guiding vehicle 10 and the trailer 11 universally connected by the force sensing mechanism 12. The variable speed prime mover 14, mounted on the guiding vehicle 10, is drivingly connected to wheels 16 through the drive 15. A second prime mover 21 is mounted on the trailer 11 and drivingly connected to the variable displacement pump 13 which in this embodiment is mounted on the trailer 11. The variable displacement pump 13 is connected to the fluid motor 19 through conduits 17 and 18 and the motor 19 drivingly engages the wheels 20 of the trailer 11. As in the embodiment of FIGURE 1 the control signal from the force sensing mechanism 12 is delivered to the variable displacement pump 13, adjusting its volume output to feed sufficient power into fluid motor 19, to maintain a constant force between the guiding vehicle 10 and the trailer 11. With the second prime mover 21 and the pump 13 mounted on the trailer 11, the trailer becomes an independent self-sustaining powered element.

Referring now to FIGURE 3, the guiding vehicle 10 has the prime mover 14 and drive 15 as in the embodiment of FIGURE 2. However, a pair of trailers 11 are coupled in tandem to the guiding vehicle 10 through force sensing mechanisms 12. The second trailer is identical to the first trailer. The performance of the mechanisms 12 are the same as generally described with reference to FIGURES 1 and 2, the constant force relationship being maintained between the multiplicity of trailers and the guiding vehicle. As indicated, when referring to FIGURE 1, and as will be described hereafter, this constant force relationship between the elements constituting the multiple traction train will be maintained irrespective of variation of traction force, or resistance of individual elements, or speed differences, in both forward and reverse directions.

Referring now to FIGURE 4, the trailer 11 has the variable speed prime mover 14 and the guiding vehicle 10 is equipped with the fluid motor 19. The prime mover 14 is drivingly connected through drive 15 to wheels 20. Variable speed prime mover 14 is also in driving engagement with the variable displacement pump 13, which through conduits 17 and 18 is operationally connected to fluid motor 19, mounted on guiding vehicle 10. The fluid motor 19 is driving connected to the wheels 16 of the guiding vehicle 10. Force sensing mechanism 12 universally connects the guiding vehicle 10 to the trailer 11. The control, as indicated in FIGURES 1 to 3, translates the force signal from the force sensing mechanism 12 to change the displacement of pump 13, to drive fluid motor 19 at a power and torque level required to maintain a constant force at the force sensing mechanism 12. In this arrangement the basic powered load element of FIGURES 2 and 3, using its prime mover, supplies through the circuit of hydrostatic transmission tractive effort to the guiding vehicle.

Referring now to FIGURE 5, a power platform generally designated as 11' is equipped with a variable speed prime mover 14', driving connected to variable displacement pump 13 also mounted on the platform 11'. The trailer 11 is universally connected to the power platform 11' by mechanical link 22. Fluid motor 19 is mounted on trailer 11 and is connected by conduits 17 and 18 to variable displacement pump 13. The fluid motor 19, through a suitable mechanical transmission 15, is connected to the traction trailer wheels 20. The guiding vehicle 10 is equipped with variable speed prime mover 14 and transmission 15, drivingly connected to traction wheels 16. The force sensing mechanism 12 universally connects the power platform 11' to the guiding vehicle 10. The control, as generally described, when referring to FIGURE 1 through 4, maintains a constant force between the guiding vehicle 10 and power platform 11', by changing displacement of the variable displacement pump 13. In this way the power platform 11' does not supply any tractive effort through its own wheels, but only acts as a power generating station, mechanically connecting the guiding vehicle 10 to the trailer 11. This arrangement gives an additional advantage, permitting use of a conventional vehicle as a guiding vehicle while providing the greatest simplicity of construction and lowest cost of the load carrying trailers. The power platform is easily transportable and carries all the power equipment.

Referring now to FIGURE 6 the power platform 11' has mounted thereon prime mover 14' drivingly connected to variable displacement pumps 13a and 13b. Trailer 11 is connected to the power platform 11' through force sensing mechanism 12 and the guiding vehicle 10 is also connected to the power platform by a force sensing mechanism 12. Fluid motor 19b mounted on trailer 11 is connected to the traction wheels 20 thorugh transmission 15. Conduits 17b and 18b connect pump 13b to motor 19b. Fluid motor 19a is mounted on the guiding vehicle 10 and connected by conduits 17a and 18a to the variable displacement pump 13a. The guiding vehicle 10 is propelled by fluid motor 19a through a mechanical transmission 15a and traction wheels 16. The automatic control, as generally described in FIGURES 1, 2, 3, 4 and 5, maintains a constant traction force between the guiding vehicle 10, power platform 11' and trailer 11. The power platform 11' does not supply any tractive effort through its own wheels, but acts as a power generating station, mechanically connecting the guiding vehicle 10 and the trailer 11. In this arrangement both the guiding vehicle 10 and the trailer 11 are of very simple construction, the fluid motors 19a and 19b being readily detachable from the respective elements. The power platform 11' is easily transportable and carries all the power equipment.

The arrangements shown in FIGURES 7 through 9 are adapted to compensate not only for variations in traction force between the vehicles, but also to compensate for steering force vectors between the vehicles. Referring now to FIGURE 7 the guiding vehicle 10 is universally connected to trailer 11, by traction force sensing mechanism 12 and steering force sensing mechanism designated generally as 23. Variable speed prime mover 14 is mounted on the guiding vehicle 10 and connected through the conventional transmission 15 to the traction wheels 16 of the guiding vehicle 10. The variable speed prime mover 14 is also drivingly connected to the variable displacement pump 13. The fluid power from the variable displacement pump 13 is transmitted through the conduits 17 and 18 to the differential valve 24. From differential valve 24 the fluid power is conducted through conduits 25 and 26 to a first fluid motor 27 and through conduits 28 and 29 to second fluid motor 30. Fluid motors 27 and 30 are drivingly connected to traction wheels 31 and 32 of the trailer 11. A control signal from the force sensing mechanism 12 is delivered to pump 13 to maintain the constant force between the guiding vehicle and the trailer in the same manner as indicated with reference to FIGURES 1 through 6. The steering force sensing mechanism 23 delivers a control signal for throttling of the differential valve 24. The differential valve 24 automatically proportions the fluid power between the fluid motors 27 and 30 to eliminate the difference in traction resistance of wheels 31 and 32 and to eliminate steering forces that normally would be developed between the guiding vehicle and the trailer. The steering force control will be hereinafter described in detail.

Referring now to FIGURE 8, the basic arrangement of the fluid power translating elements, namely variable displacement pump 13, differential valve 24, fluid motors 27 and 30, traction force sensing mechanism 12 and steering force sensing mechanism 23 is the same as that described, when referring to FIGURE 7. However, the variable displacement pump 13 is now located on the trailer 11 which contains a separate prime mover 21. In this arrangement the trailer 11 can act as a separate and independent powered unit. The guiding vehicle 10 is of conventional construction and provides guidance and a portion of the traction effort to the trailer 11 utilizing its own variable speed prime mover 14.

Referring now to FIGURE 9, the arrangement of the guiding vehicle 10 and trailer attached thereto is identical to that of FIGURE 8. However, a second trailer 11 identical to the first trailer is connected through traction force sensing mechanism 12 and steering force sensing mechanism 23 to the trailer coupled directly to the guiding vehicle 10. The performance of the automatic controls is the same as generally described in FIGURES 7 and 8. The constant force relationship is maintained between the multiplicity of trailers and the guiding vehicle. At the same time the steering forces between the multiplicity of trailers and the guiding vehicle are maintained at zero level. This constant force relationship both in direction of traction effort and in horizontal plane of the steering forces will be maintained between the elements constituting the traction train by the automatic controls, irrespective of variation in the traction resistance of individual elements, or when driving at different speeds in both forward and reverse directions.

Referring now to FIGURE 10, the arrangement of the power elements and basic automatic controls is exactly the same as described when referring to FIGURE 1. The schematic arrangement of the power elements and controls is shown in greater detail, when the guiding vehicle 10 takes the form of a tractor. The variable speed prime mover 14 is drivingly connected through mechanical transmission 15 to traction wheels 16. The mechanical transmission 15 also drives variable displacement pump 13, which is connected through conduits 17 and 18 to the fluid motor 19, mounted on the trailer 11. The fluid motor 19, through a conventional mechanical differential 34, is drivingly connected to the trailer traction wheels 20. Traction force sensing mechanism 12 is mounted on the tractor structure and connected by universally mounted pull bar 35 to the trailer 11. The control signal from the traction load sensing mechanism 12 is fed into automatic control 36 to be described presently, which adjusts the displacement of the variable displacement pump 13, to maintain a constant traction force between the tractor and the trailer 11. The control 36 is adjustable by means of the control handle 37, so that the level of the traction force, existing between the tractor and the trailer, can be varied, the automatic control maintaining this force constant at any pre-set level.

Referring now to FIGURE 11 the basic power elements and control elements of FIGURE 2 are shown in greater detail, as applied to a tractor. The basic performance of this arrangement is the same as that described when referring to FIGURE 10. The fluid motor 19, driving the trailer 11, is powered by variable displacement pump 13, driven by second prime mover 21, mounted on the trailer. Displacement changing mechanism 38 is mounted on the variable displacement pump 13 and is connected through control line 39 to the control 36. The control 36 is equipped with adjustable control lever 37 to vary the selected control level. The control signal from the traction force sensing mechanism 12 is fed into the control 36. The operation of this arrangement is the same as that described in FIGURE 10.

Referring now to FIGURE 12, the traction force sensing mechanism 12 is shown in detail; at one end it is connected by the universally mounted link 35 to the trailer (not shown). At the other end the traction force sensing mechanism 12 is mounted on the guiding vehicle frame 10 by suitably retained torsion bar element 40. The torsion bar element 40 at one end is splined to extension 41 of the guiding vehicle. At the other end of the torsion bar 40 is journalled in bearing 42, suitably retained in extension 43 of the guiding vehicle. The longitudinal forces or traction forces from the traction force sensing element 12 are directly transmitted to the guiding vehicle 10 through the extensions 41 and 43 by the torsion bar 40. The steering forces transmitted from the trailer to the traction force sensing mechanism 12 through pin 44 passing transversely through torsion bar 40 will produce a torsional deflection of the torsion bar 40. Since one end of the torsion bar 40 is journalled in the bearing 42, the angular deflection of the torsion bar 40 will move control valve spool 45 through pin 46 having a spherical head 47. This spool forms a part of the steering force control circuit. The operation of the steering force control circuit will be described in greater detail when referring to FIGURE 15. The universally mounted link 35, through the part spherical head 48, engages a slide 49, retained by sliding bearings 50 and 51 in housing 52. Springs 53 and 54 bias the slide 49 to its neutral position. A shaft 55, suitably retained in the slide 49, engages through cammed surfaces 56 a control beam 57 pivotally mounted by pivot pin 58 to control lever 37. The control lever 37 is mounted for limited rotation by pin 59, retained in extension 60 of the housing 52. The slotted end of the control beam 57 pivotally and slidably engages pin 61 retained in control valve spool 62. The control valve spool 62 has lands 63, 64 and 65, defining chambers 66 and 67 and is axially slidable in a control bore 68. The control bore 68 is located in housing 52 and has an annular groove 69. The chamber 67 is connected through passages 70 and 71 to high pressure port 72 of control pump 73. The chamber 66 is connected through passages 74 and 75 to the low pressure zone 76. A conventional relief valve 77 cross-connects passages 71 and 75. The annular groove 69 is connected through passage 78 to a control port 79 of the variable displacement pump generally designated as 13. The variable displacement pump 13 preferably is of the axial piston type. The pump 13 includes a pump housing 80 defining a chamber 81, having a rotatable cylinder barrel 82 positioned therein. The cylinder barrel 82 is provided with plurality of cylinder bores each having a piston 83 axially slidable therein. Pistons 83 have spherical ends 85 universally mounting piston shoes 86. The cylinder barrel 82 is positioned axially between a valve plate 87 and thrust plate or cam plate 88. The valve plate 87 with diagrammatically shown porting passage 89 and 90 provides properly phased fluid connection between cylinder bores of the cylinder barrel 82, in a well known manner. The thrust plate 88 is tiltably mounted with respect to the pump housing 80 of in 91. An extension 92 of thrust plate 88 has spherical pivot 93, engaging a control piston rod 94 of a control piston 95. The control piston 95 is slidably mounted in control piston chamber 96, provided in the pump housing 80 and biased by spring 97. A drive shaft 98, journalled in the pump housing 80, by bearings 99 and 100, is connected to cylinder barrel 82 and is effective to transmit torque to the cylinder barrel 82 from a diagrammatically shown prime mover 14. The porting passages 89 and 90 are connected through ducts 101 and 102 to diagrammatically shown fluid motor 19, mounted on a trailer (not shown).

FIGURE 13 shows another embodiment of the traction force sensing mechanism designated generally as 112 which can be used in the basic combinations of component elements as shown in FIGURE 12. The traction force sensing mechanism 112 is universally mounted between pivots 113 and 114 and mechanically connects the trailer 11 and the guiding vehicle 10. The traction force sensing mechanism 112 comprises cylinder 115, slidably engaging a piston 116. The piston 116 has a piston rod 117 extending therefrom and sealed in the cylinder by seal 118. An O ring seal 119 seals the piston 116 in the cylinder and divides the cylinder functionally into chambers 120 and 121, which chambers contain hydraulic fluid. The chamber 120 is connected through passage 122 to a chamber 123 defined by a force cylinder 124, slidably engaging a force piston 125. The force piston 125 is biased by spring 126 to the right as seen in FIGURE 13. The force piston 125 engages control beam 127 through pin 128 mounted intermediate the ends of the control beam. The control beam 127 has a slotted portion 129 which is slidably and tiltably engaged by control lever 130. The other end of the control beam 127 operatively engages control valve spool 62. The control valve is connected in the same way as in FIGURE 12.

FIGURE 14 is yet another embodiment of the traction force sensing mechanism. The traction force sensing mechanism, generally designated as 131', is generally of the same construction and is identically mounted with respect to guiding vehicle and trailer, as described in FIGURE 13. The cylindrical spaces 120 and 121 are connected through ports 131 and 132 to pneumatic spring assemblies 133 and 134. The pneumatic spring assemblies 133 and 134 are of identical construction. Each spring assembly has a diaphragm 135 dividing it into spaces 136 and 137. Space 136 is filled with a compressible fluid and space 137 is in communication with the hydraulic fluid in chamber 120, and 121.

Referring now to FIGURE 15 the steering force control, partially shown in FIGURE 12, is illustrated in more detail. The traction force sensing mechanism 12 is connected through the universally mounted spherical head 48 to the trailer (not shown) and is secured by pin 44 to the torsion bar 40 shown in elevation in FIGURE 12. The steering forces shown vectorially as arrows V will be transmitted from the trailer through spherical head 48 and will angularly deflect torsion bar 40, as diagrammatically shown by arrows A. As already described, when referring to FIGURE 12, the angular deflection of the torsion bar 40 will produce movement of pin 46, which by the spherical head 47 will move control valve spool 45. The control valve spool 45 has lands 140, 141, and 142, defining spaces 143 and 144 therebetween. The control valve spool 45 is slidably guided in a bore 145 having relieved annular rings 146, 147 and 148. The annular ring 146 is connected through passage 149 to the high pressure port 72 of control pump 73, also shown in FIGURE 12.

The differential steering valve, generally designated as 150, includes a valve spool 151 and valve body 152. The spool 151 has lands 153, 154, and 155. The spool 151 slidably engages a bore 157, defined by the valve body 152 and is biased by springs 158 and 159. A chamber 160 defined between the end of the valve body 152 and the land 153 is connected through port 161 and passage 162 to annular ring 148. A chamber 163 defined between the valve body 152 and the land 155 is connected through port 164 and passage 165 to annular ring 147. A chamber 166 is defined between lands 153 and 154 and is connected through passage 167 to first port 168, of diagrammatically shown variable displacement pump 13. The chamber 166 also is connected through port 170 and passage 171 to port 172 of fluid motor 27 (see FIGURES 7-9) and through port 173 and passage 174 to port 175 of fluid motor 30. A chamber 176 is defined between lands 154 and 155 and is connected through passage 177 to a second port 178 of the variable displacement pump 13. Chamber 176 also is connected through port 179 and passage 180 to port 181 of the fluid motor 27 and through the port 182 and passage 183 to port 184 of the fluid motor 30. The chambers 160 and 163 are connected through metering orifices 185 and 186 respectively and through passages 187 and 188 respectively to the low pressure zone 76 of the pump 73. The variable displacement pump 13 is driven by a prime mover 14, shown diagrammatically.

OPERATION

Referring now to FIGURE 12, variable displacement pump 13, in a well known manner, translates the mechanical energy supplied by a prime mover 14 into fluid pressure energy. The generated fluid power is a product of the fluid volume displaced by the pump per unit time and system pressure. The volume of fluid displaced by the pump is proportional to the rotational speed of the prime mover and the angle of inclination of a thrust plate 88. The system pressure in this system depends entirely on the traction resistance encountered by fluid motor 19. In this embodiment the fluid motor 19 is of fixed displacement type and therefore the fluid motor r.p.m. will be proportional to the volume of fluid displaced by the pump per unit time. In a tractor-trailer hydrostatic transmission circuit, to which this invention is primarily directed, unless the traction drives of both the tractor and trailer are exactly synchronized, forces will be supplied from tractor to trailer or vice-versa. According to this invention the fluid flow-out of the pump is automatically adjusted to synchronize exactly, at all times, the drive of the trailer to the drive of the tractor.

As is well known in the art, the angular rotation of the thrust plate 88, from the position as shown in FIGURE 12, in a clockwise direction, will gradually decrease the volume output of the pump, until with thrust plate 88 perpendicular to the longitudinal axis of the pump 13, this volume output will become zero. Further clockwise rotation of the thrust plate 88, in a well known manner, will reverse the polarity of ports 89, and 90 and therefore reverse the direction of rotation of the fluid motor 19 in a well known manner. The pump will reach its maximum volume output in reverse at the end of arc of travel of the thrust plate 88.

The resultant forces between the tractor and trailer will be transmitted through universally mounted link 35 and its spherical head 48 to slide 49. Under action of these forces the slide 49 will move relative to housing 52 against the bias of the springs 53 and 54. This relative displacement of the slide 49 in either direction will be proportional to the magnitude of the resultant force existing between the tractor and the trailer. This relative motion of the slide 49 is transmitted through the shaft 55, equipped with cammed surface 56, to the control beam 57. Therefore, movement of slide 49 will swing the control beam 57 around pivot pin 58. The slotted end of the control beam 57, through pin 61, will impart a sliding motion to the control valve spool 62. Therefore, the relative movement of the slide 49, with respect to housing 52, will transmit proportional movement, with help of biasing spring 61a, to the control valve spool 62.

In FIGURE 12, the control valve spool 62 is shown in its neutral position with the land 64 blocking the passage 78 leading to the control piston chamber 96. Introduction of fluid pressure into control piston chamber 96 will swing the thrust plate 88 against bias of spring 97 in a clockwise direction from the position of the maximum flow, as shown in FIGURE 12, through zero flow position to the position of maximum flow in the reverse direction. With the control piston chamber 96 connected to the low pressure zone the thrust plate 88 will swing through the full arc, activated by the biasing spring 97, and reach a maximum angular position.

The movement of the control valve spool 62 to the right as seen in FIGURE 12 will connect the control piston chamber 96 with chamber 66 and movement to the left will connect the chamber 96 to chamber 67. Chambers 66 and 67 are connected to the low pressure zone 76 and the high pressure port 72, of the control pump 73 respectively.

In this manner the force fluctuations in the universally mounted link 35, resulting in the movement of the slide 49, will be translated by the above described control into rotation of the thrust plate 88 and therefore into the change of displacement of the pump 13.

The displacement of the slide 49, which is proportional to the existing force between the frames of the tractor and trailer, will originate the signal to change the pump displacement. The resulting change in the pump displacement will correct the force imbalance on the slide 49, bringing the control valve spool 62 into its neutral position, as shown in FIGURE 12. This self-correcting, automatic, continuous procedure will keep the tractor-trailer drives in a state of complete synchronization.

As shown in FIGURE 12, the neutral position of the slide 49 corresponds to neutral position of control valve spool 62 and therefore forces between the tractor and trailer frames will be kept at zero level. By moving the control lever 37, the pivot pin 58 is displaced and therefore the neutral position of the control valve spool 62 will occur at an off-center position of slide 49. In such a position the springs 53 or 54 will be deflected, transmitting equivalent force from the link 35 to the housing 52, this equivalent force existing between the tractor and trailer. Therefore by adjusting the control lever 37 the link 35 can be maintained in a controlled state of tension or compression, within the capacity of the springs 53 and 54. The magnitude and the direction of this force, maintained between the tractor and the trailer, will depend on the position of the control lever 37 and can be set at any desired value, which will then be automatically maintained by the control as described above.

With the control lever 37, in position as shown in FIGURE 12, and the tractor or guiding vehicle stationary, the thrust plate 88 will automatically rotate to a position equivalent to zero pump displacement. This is accomplished through the control by the trailer, actuated by the fluid motor 19, bringing the slide 39 through link 35 into its neutral position.

With the guiding vehicle starting forward from rest the slide 49 will be displaced to the right, as seen in FIGURE 12. This will move shaft 55 to the right which will move the valve spool 62 to the right through control beam 57. Movement of the spool 62 to the right will open control piston chamber 96 to the low pressure zone through passage 78, chamber 66, and passage 74. The thrust plate 88 will start rotating counter-clockwise under action of spring 97. The pump 13 will then supply fluid under pressure to fluid motor 19 which supplies traction drive to the wheels of the trailer. The resulting drive movement of the trailer by the motor 19 will overcome the separating force induced by the tractor and will move the slide 49 and the control valve spool 62 to the right into the neutral position. As is evident from the above description any deceleration or acceleration of the guiding vehicle will originate the cycle of adjustment of the control, with the control arrangement always tending to correct itself to the neutral position, as shown in FIGURE 12.

With the guiding vehicle, from standstill, starting to move in reverse, an opposite cycle of control operations will be originated. The movement of slide 49 will be to the left, as seen in FIGURE 12, thus moving to the left, the control valve spool 62. Movement of the spool 62 to the left will connect control piston chamber 96 to the high pressure port 72 of pump 73 through passage 78, chamber 67, and passage 71. From its neutral vertical position the thrust plate 88 will be rotated clockwise by the action of the high pressure fluid against piston 95, into the zone of reverse driving of motor 19. When the driving force of the motor on the trailer overcomes the compressive force exerted by the tractor, the slide 49 and spool 62 will return to their neutral positions, as described above, tending to establish a steady state condition resulting in zero or any pre-set value of the force to be maintained between the frames of the tractor and the trailer.

Through the action of the control, while driving in forward or reverse, the fluid motor 19, responding to the pump 13, will either brake or accelerate the trailer to maintain a pre-set force between the tractor and the trailer, as dictated by the position of the control lever 37.

Referring now to FIGURE 13, another embodiment of the force sensing mechanism is shown. The mechanism as shown in FIGURE 13 can be directly introduced into the control circuit of FIGURE 12, and perform in a similar manner. In FIGURE 12 the motion of the slide 49, proportional to the forces existing between the tractor and the trailer, mechanically operates control valve spool 62 to adjust the displacement of pump 13.

In FIGURE 13 the forces existing between the tractor and the trailer are directly translated into a pressure signal. The pivot 113 is connected to trailer 11 and the pivot 114 is connected to tractor 10. The cylinder 115 slidably engages, in the direction of the exerted force, piston 116 and piston rod 117. The cylindrical spaces 120 and 121 contain hydraulic fluid sealed in by seals 118 and 119. Any force developed between the pivots 113 and 114 will be directly translated, in a well known manner, into hydraulic pressure proportional to the developed force. This hydraulic pressure is fed through the passage 122 to chamber 123, wherein the pressure acts on the cross-section area of the force piston 125 against the bias of spring 126. Therefore in this arrangement the force between the tractor and trailer frames, translated into hydraulic pressure, will be translated into proportional movement of force piston 125 as in the embodiment of FIGURE 12. The movement of the force piston 125, through pin 128 will swing control beam 127 around the spherical end of the control lever 130, inducing a sliding motion in the control valve spool 62. Since only the cylindrical space 120 is operationally connected to force piston 125, the embodiment of FIGURE 13 can only maintain a constant preselectable load in tension. A gradual rise in pressure in cylindrical space 120, up to a limit as dictated by the characteristics of the spring 126, will induce full proportional movement of the force piston 125. As already described with reference to FIGURE 12, the position of the control lever 130 will change the pressure level at which the valve control spool 62 will reach its neutral position, as shown in FIGURE 13. Since the passage 78 is connected to control the piston chamber 96 and since chamber 66 and 67 of the control valve 62 are connected to the low pressure zone and to high pressure port respectively of pump 73 as described with reference to FIGURE 12, the movement of the control valve spool 62 will influence the position of the thrust plate 88 in the same manner, as already described when referring to FIGURE 12. From any preselectable force level, as dictated by the control lever 130, the control valve spool 62 will be moved out of neutral position, adjusting the pump displacement, to maintain a constant preselectable force level between the tractor and the trailer.

In the embodiment of FIGURE 13 the hydraulic liquid filling the cylindrical spaces 120 and 121 is for all practical purposes incompressible. Therefore the above arrangement gives an advantage of producing the force signal at minimum relative displacement of the tractor and the trailer. However, as pointed out above, the embodiment of FIGURE 13 will transmit the control signal only in one direction. However, as is well known in the art, the space 120 can be used to feed an additional control signal to the back of the force piston 125 and an additional biasing spring introduced into the chamber 123. With this modification the arrangement of FIGURE 13 would transmit a bi-directional force signal to the control, as the embodiment of FIGURE 12.

Referring now to FIGURE 14, yet another embodiment of the force sensing element is shown. The element of FIGURE 13 generating the pressure signal proportional to force existing between the tractor and the trailer has an inherent high spring rate, because of the relative incompressibility of the hydraulic fluid. To improve the shock absorbing characteristics of the connecting link two pneumatic spring assemblies 133 and 134 are connected to the hydraulic fluid filled cylindrical spaces 120 and 121 respectively. A high pressure pneumatic charge is introduced into the spaces 136, sealed from the hydraulic oil by diaphragms 135. In this way the spring rate of the connecting link can be regulated and the rate of the change of the pressure signal, fed into automatic control, synchronized with response to the characteristics of the control. Although in the disclosed embodiment only the cylindrical space 121 is connected to the force sensing piston, making the control unidirectional from the force sensing standpoint, the space 120 can be connected to slightly modified version of the force sensing mechanism, making the arrangement bidirectional, as explained when referring to FIGURE 13.

Referring again to the operation of the control, as shown in FIGURE 12, the variable displacement pump 13 operates a single fluid motor 19, mounted to the frame of the trailer. However, two hydraulic motors 27 and 30 of similar construction can be fed from the same variable displacement pump and connected in parallel as shown in FIGURE 7. These two fluid motors, in this type of hydrostatic transmission circuit, form the hydraulic differential. The basic torque transmitting characteristics of the hydraulic motors, in a parallel circuit, is similar to the action of a well known principle of mechanical differential. Such an arrangement, of course, will always transmit the total power developed by the prime mover, but within its mechanical structure can proportionally divert the power to either of the traction wheels. A change in traction resistance of one wheel, with respect to the other, will tend to change the relative rotation of the two. In a four wheel vehicle the change of relative speed of driving wheels is very beneficial while turning. When traveling on a straight road the stability of the vehicle is maintained by the equalizing forces, transmitted from the steering wheels through the structure of the frame. The differential action, very beneficial in a four wheel vehicle, although it will help while guiding a two wheel power trailer, will introduce some addition parasitic effects. Wtih varying traction resistance at the driving wheels of the trailer, a force in the horizontal plane will be transmitted to the guiding vehicle. As already mentioned above, this is the force which in a four wheeled vehicle is absorbed by the frame.

The arrangement as shown in FIGURE 15, automatically eliminates those forces in the horizontal plane improving the stability of the guiding vehicle when connected to a two wheel powered trailer, driven by two hydraulic motors in parallel. The control of the embodiment of FIGURE 12 for equalizing forces as previously described is not affected by the action of the steering force control, the variable displacement pump supplying fluid to the fluid motors to maintain a preselectable draw bar force between the guiding vehicle and the trailer. This fluid power supplied by the variable displacement pump and regulated to maintain a preselectable draw bar pull is selectively diverted by the steering force control to the fluid motors, to maintain a zero steering force between the guiding vehicle and the trailer. For example, if one wheel of the trailer encounters a higher traction resistance, a proportional steering force will be transmitted to the guiding vehicle frame. The control as shown in FIGURE 15 will eliminate this force, by automatically diverting more power, out of total fluid power supplied from the pump, to the wheel which encounters higher traction resistance.

This action of diverting the fluid power to the fluid motors 27 and 30, from the single variable displacement pump 13, driven by prime mover 14, is accomplished by the differential steering valve 150 (FIGURE 15). The control spool valve 151, of the differential steering valve 150, is shown in a neutral position. Depending on the angle of inclination of the thrust plate of the variable displacement pump 13, port 168 will be the high pressure port, and port 178 will be the low pressure port or vice-versa. The fluid from the pump 13 is then supplied through passage 167 to chamber 166, from whence it is supplied to port 172, of fluid motor 27 and to port 175 of fluid motor 30. The return fluid from the ports 181 and 184, of the fluid motors 27 and 30, is supplied from chamber 166, through passage 177, to pump port 178. The movement of the control valve spool 151, from the neutral position as shown, will very the resistance of the ports 170, 173, 179, and 182 by closing or opening a portion of the respective ports by lands 153, 154 and 155. Therefore by creating an additional resistance in the pressure of exhaust ports, leading to the respective fluid motors, the differential steering valve 150 can divert more or less power to either of the motors, depending on the direction of movement of the control valve spool 151 and the direction of rotation of the motors.

As shown in FIGURE 15, the control valve spool 151 is maintained by two biasing springs 158 and 159 in its neutral position, corresponding to equal division of power to motors 27 and 30. An introduction of a control pressure signal to spaces 160 or 163 will move the control valve spool 151, controlling the power diverted to each motor. This control signal is supplied through passages 162 and 165 from the control valve shown in FIGURE 15.

The high pressure fluid from the high pressure port 72, of the control pump 73, is supplied through passage 149 to the annular ring 146, which in the neutral position, as shown, is closed by the land 141, of the control valve spool 45. The movement of the control valve spool 45, in either direction from the position as shown, will connect the high pressure oil to chamber 160 or 163, actuating the differential steering valve 150. The spaces 160 and 163 are connected through the metering orifices 185 and 186 and passage 187 to the low pressure zone, and, therefore, the pressure developed in the spaces 160 and 163 is proportional, at any instant, to the ratio of the areas uncovered by the control valve spool and the fixed areas of the orifices 185 and 186.

The control valve spool 45 is actuated by angular movement of the pin 46. This angular movement, graphically represented by arrows A, is proportional to the magnitude of the forces represented by arrows V, which are supplied from the link 35 (FIGURE 12). The forces V deflect the torsion bar 40, to which the housing 52 is keyed by pin 44.

In this way a movement proportional to the magnitude of the steering forces, existing between the tractor and the trailer, is introduced to the control valve spool 45, which in turn is translated into movement of the spool 151, which in turn regulates the amount of power diverted to motors 27 and 30. This control circuit is self-correcting and by diverting more or less power to individual motors, the steering forces between the tractor and the trailer will be completely eliminated. It is apparent that the action of the steering force control is independent of the traction force control, although some of the components are common to both.

Under the conditions of equal traction resistance at both of the driving trailer wheels the steering control is completely inactive. Assuming that one of the wheels now would encounter a stone, curb or ramp or similar obstacle, this would induce a turning force in the trailer, which normally would have to be transmitted to the tractor and could upset its equilibrium. Through the steering force mechanism a sufficient amount of power is diverted into the motor, driving the wheel which encountered the resistance so that this turning force would be completely eliminated, or reduced, if the maximum torque capacity of the motor is exceeded.

The system as described above which, is the subject of this invention, permits connecting the trailers into the train as shown in FIGURES 3 and 9 and with its inherent flexibility permits the use of the components which could be treated as accessories, being readily detachable.

While several embodiments have been described various changes and modifications may obviously be made without departing from the true spirit and scope of the invention defined in the appended claims.

What is claimed is:

1. In an arrangement comprising guiding means and guided means for transporting a load, means interconnecting said guiding means and said guided means, and means to impart a motion to said guiding means and said guided means including a prime mover means and first and second driving means; the combination therewith of a power transmission and control system interposed between said prime mover means and one of said driving means, said system including a fluid pump driven by said prime mover, fluid motor means drivingly connected to said driving means, fluid power conducting means between said pump and said motor, force sensing means adapted to sense force between said guiding means and said guided means, means responsive to said force sensing means to translate force into a control signal, drive regulating means responsive to said control signal to maintain a substantially constant force level between said guided and said guiding means, said drive regulating means including power control means responsive to said control signal to vary the power developed by said fluid motor when the force level between the guiding means and guided means deviates from a given value, said means responsive to the force sensing means including means to maintain the power developed by said fluid motor in the absence of a control signal.

2. The combination of claim 1 characterized by means operably connected to said means responsive to said force sensing means to selectively vary force level maintained between said guiding means and said guided means.

3. In an arrangement comprising guiding means and guided means for transporting a load, means interconnecting said guiding means and said guided means, means to impart a motion to said guiding means and said guided means including a prime mover and first driving means for driving said guiding means and second driving means for driving said guided means; the combination therewith of a fluid power transmission and control system interposed between said prime mover and said second driving means, said system including a fluid pump driven by said prime mover, a fluid motor drivingly connected to said second driving means, fluid power conducting means between said pump and said motor, force sensing means adapted to sense force between said guiding means and said guided means, means responsive to said force sensing means to translate force into a control signal, drive regulating means responsive to said control signal to maintain a substantially constant force level between said guided and said guiding means, said drive regulating means including power control means responsive to said control signal to vary the power developed by said fluid motor when the force level between the guiding means and guided means deviates from a given value, said means responsive to the force sensing means including means to maintain the power developed by said fluid motor in the absence of a control signal.

4. The combination of claim 3 characterized by means operably connected to said means responsive to said force sensing means to selectively vary force level maintained between said guiding means and said guided means.

5. In an arrangement comprising a guiding vehicle and a guided vehicle for transporting a load, means interconnecting said guiding vehicle and said guided vehicle, means to impart a motion to said guiding vehicle and said guided vehicle including a prime mover, traction means for said guiding vehicle, traction means for said guided vehicle, and power transmission means between said prime mover and said traction means of guiding vehicle; the combination therewith of a fluid power transmission and control system interposed between said prime mover and said traction means for said guided vehicle, said system including a fluid pump driven by said prime mover, a fluid motor drivingly connected to said traction means for said guided vehicle, fluid power conducting means between said fluid pump and said fluid motor, force sensing means adapted to sense the force between said guiding vehicle and said guided vehicle, means responsive to said force sensing means to translate force into a control signal, drive regulating means responsive to said control signal to maintain a substantially constant force level between said guided and said guiding vehicles, said drive regulating means including power control means responsive to said control signal to vary the power developed by said fluid motor when the force level between the guiding vehicle and guided vehicle deviates from a given value, said means responsive to the force sensing means including means to maintain the power developed by said fluid motor in the absence of a control signal.

6. In an arrangement comprising a guiding vehicle and a guided vehicle for transporting a load, means interconnecting said guiding vehicle and said guided vehicle, means to impart a motion to said guiding vehicle and said guiding vehicle and said guided vehicle including a prime mover, traction means for said guiding vehicle, traction means for said guided vehicle, and power transmission means between said prime mover and said traction means of the guiding vehicle, the combination therewith of a second prime mover mounted on said guided vehicle, a fluid power transmission and control system interposed between said second prime mover and said traction means for guided vehicle, said system including a fluid pump driven by said second prime mover, a fluid motor drivingly connected to said traction means for said guided vehicle, fluid power conducting means between said fluid pump and said fluid motor, force sensing means adapted to sense the force between said guiding vehicle and said guided vehicle, means responsive to said force sensing means to translate force into a control signal, drive regulating means responsive to said control signal to maintain a substantially constant force level between said guided and said guiding vehicles, said drive regulating means including power control means responsive to said control signal to vary the power developed by said fluid motor when the force level between the guiding vehicle and guided vehicle deviates from a given value, said means responsive to the force sensing means including means to maintain the power developed by said fluid motor in the absence of a control signal.

7. In an arrangement comprising a guiding vehicle and a multiplicity of guided vehicles for transporting loads, connecting means between each of said vehicles, means to impart a motion to said guiding vehicle and said guided vehicles including a first prime mover mounted on said guiding vehicle, traction means for said guiding vehicle, traction means for each of said guided vehicles, and power transmission means between said prime mover and said traction means of guiding vehicle, a prime mover mounted on each of said guided vehicles, a fluid power transmission and control system interposed between each prime mover on the guided vehicles and the traction means of the guided vehicle, each system including a fluid pump driven by its prime mover, a fluid motor drivingly connected to said traction means for the guided vehicle, fluid power conducting means between said fluid pump and said fluid motor, force sensing means adapted to sense the force between successive vehicles, means responsive to said force sensing means to translate force into a control signal, drive regulating means responsive to said control signal to maintain a substantially constant force level between successive vehicles, said drive regulating means including power control means responsive to said control signal to vary the power developed by said fluid motor when the force level between the successive vehicles deviates from a given value, said means responsive to the force sensing means including means to maintain the power developed by said fluid motor in the absence of a control signal.

8. In an arrangement comprising a guiding vehicle and a guided vehicle for transporting a load, means interconnecting said guiding vehicle and said guided vehicle, means to impart a motion to said guiding vehicle and said guided vehicle including a prime mover, traction means for said guiding vehicle, traction means for said guided vehicle and power transmission means between said prime mover and said traction means of said guided vehicle, the combination therewith of a fluid power transmission and control system interposed between said prime mover and said traction means for guiding vehicle, said system including a fluid pump driven by said prime mover, a fluid motor drivingly connected to said traction means for said guiding vehicle, fluid power conducting means between said fluid pump and said fluid motor, force sensing means adapted to sense the force between said guiding vehicle and said guided vehicle, means responsive to said force sensing means to translate force into a control signal, drive regulating means responsive to said control signal to maintain a substantially constant force level between said guided and said guiding vehicles, said drive regulating means including power control means responsive to said control signal to vary the power developed by said fluid motor when the force level between the guiding vehicle and guided vehicle deviates from a given value, said means responsive to the force sensing means including means to maintain the power developed by said fluid motor in the absence of a control signal.

9. The combination of claim 8 characterized by control adjusting means operatively connected to said means responsive to said force sensing means to vary the level of the force maintained between said guiding vehicle and said guided vehicle.

10. In an arrangement comprising a guiding vehicle and a guided vehicle for transporting a load; the combination therewith of a power station connecting said guiding vehicle and said guided vehicle, means to impart a motion to said guiding vehicle and said guided vehicle including a prime mover mounted on said power station, traction means for said guiding vehicle, traction means for said guided vehicle, fluid power transmission and control system interposed between said prime mover and said traction means for the guided vehicle, said system including a fluid pump driven by said prime mover, a fluid motor drivingly connected to said traction means for the guided vehicle, power control means adapted to vary the power of said fluid motor, force sensing means adapted to sense the force between said power station and said guiding vehicle means responsive to said force sensing means to translate force into a control signal, drive regulating means responsive to said control signal to maintain a substantially constant force level between said power station and said guiding vehicle, said drive regulating means including power control means responsive to said control signal to vary the power developed by said fluid motor when the force level between the guiding vehicle and power station deviates from a given value, said means responsive to the force sensing means including means to maintain the power developed by said fluid motor in the absence of a control signal.

11. In an arrangement comprising a guiding vehicle and a guided vehicle for transporting a load, the combination therewith of a self propelled power station connecting said guiding vehicle and said guided vehicle, means to impart a motion to said guiding vehicle and said guided vehicle including a variable speed prime mover mounted on said self propelled power station, traction means for said guiding vehicle, traction means for said guided vehicle, traction means for said power station, power transmission means interposed between said variable speed prime mover and said traction means of the power station; a first fluid power transmission and control system interposed between said variable speed prime mover and said traction means for the guiding vehicle, a second fluid power transmission and control system interposed between said variable speed prime mover and said traction means for the guided vehicle, each fluid power transmission and control system including a fluid pump driven by said variable speed prime mover, a fluid motor drivingly connected to its corresponding traction means, fluid power conducting means between the fluid pump and the fluid motor, first force sensing means adapted to sense the force between said power station and the guiding vehicle, means responsive to said first force sensing means to translate force into first control signal, first drive regulating means responsive to said first control signal to maintain a substantially constant force level between said power station and said guiding vehicle, said first drive regulating means including power control means responsive to said first control signal to vary the power developed by said fluid motor when the force level between the guiding vehicle and power station deviates from a given value, said means responsive to the first force sensing means including means to maintain the power developed by said fluid motor in the absence of a control signal, and second force sensing means adapted to sense the force between said power station and the guided vehicle, means responsive to said second force sensing means to translate force into second control signal, second drive regulating means responsive to said second control signal to maintain a susbtantially constant force level between said guided vehicle and said power station, said second drive regulating means including power control means responsive to said second control signal to vary the power developed by said fluid motor when the force level between the power station and the guided vehicle deviates from a given value, said means responsive to the second force sensing means including means to maintain the power developed by said fluid motor in the absence of a control signal.

12. In an arrangement comprising a tractor having a prime mover and traction wheels connected by a mechanical transmission to said prime mover, and a trailer having traction wheels, connecting means between said tractor and said trailer; a hydrostatic transmission and control system interposed between said prime mover and said traction wheels of said trailer comprising, a hydraulic pump member driven by said prime mover, a hydraulic motor member drivingly connected to said traction wheels of said trailer, duct means between said pump and said motor, force sensing means adapted to sense the force between said tractor and said trailer, means responsive to said force sensing means to translate force into a control signal, drive regulating means responsive to said control signal to maintain a substantially constant force level between said tractor and said trailer, said drive regulating means including power control means responsive to said control signal to vary the power developed by said fluid motor when the force level between the tractor and trailer deviates from a given value, said means responsive to the force sensing means including means to maintain the power developed by said fluid motor in the absence of a control signal.

13. The device of claim 12 wherein said power control means includes means to vary the displacement of at least one of said members.

14. The device of claim 12 wherein said power control means includes means to vary the displacement of said pump member.

15. The device of claim 12 further characterized by said means responsive to said force sensing means having adjusting means whereby the magnitude of the force between said tractor and said trailer can be varied and maintained constant for each particular setting of said adjusting means.

16. The device of claim 12 further characterized by said force sensing means including means to translate force to movement.

17. The device of claim 12 further characterized by said force sensing means including force to pressure translating means.

18. The device of claim 16 further characterized by said means responsive to said force sensing means including valve means, a control beam operationally connected intermediate to its ends to said means to translate force to movement and to said valve means, a source of control pressure, duct means between said source of control pressure and said valve means and a duct means between said valve means and said power control means.

19. The device of claim 18 further characterized by said force to movement translating means including housing means, slide means, and spring biasing means interposed between said housing means and said slide means whereby a force transmitted through the arrangement will produce a proportional relative movement between said housing and said slide means.

20. In an arrangement comprising a tractor having a prime mover and traction wheels connected by a mechanical transmission to said prime mover and a trailer having traction wheels, connecting means between said tractor and said trailer, the combination therewith of a hydrostatic transmission and control system interposed between said prime mover and said traction wheels of said trailer, said system including a variable displacement hydraulic pump driven by said prime mover, a fixed displacement hydraulic motor drivingly connected to said traction wheels of said trailer, duct means between said variable displacement pump and said fixed displacement motor, pump displacement control means adapted to vary the speed of the hydraulic motor, said connecting means including a force sensing device adapted to sense force between said tractor and said trailer, means responsive to said force sensing device to translate force into a control signal, drive regulating means responsive to said control signal to maintain a substantially constant force level between said tractor and said trailer, said drive regulating means including power control means responsive to said control signal to vary the displacement of said pump when the force level between the tractor and the trailer deviates from a given value, said means responsive to the force sensing means including means to maintain the displacement of said pump in the absence of a control signal.

21. The device of claim 20 further characterized by said means to vary the displacement of the pump including a tiltable thrust plate in the pump, and said drive regulating means including a control cylinder, control piston means mounted in said control cylinder and linked to said tiltable thrust plate, and biasing means interposed between said control cylinder and said control piston means.

22. The device of claim 20 wherein said means responsive to said force sensing device includes means to translate force to pressure and said drive regulating means includes means to translate pressure to movement to operate said pump displacement control means.

23. The device of claim 22 further characterized by said means to translate pressure to movement including a cylinder, a piston slidably disposed in said cylinder, biasing means interposed between said piston and said cylinder, pressure conducting means interconnecting said means to translate force to pressure and said cylinder adapted to transmit a pressure signal to said cylinder and urge the piston against said biasing means whereby piston movement is proportional to the pressure signal.

24. The device of claim 22 further characterized by said means responsive to the means to translate pressure to movement including a valve adapted to supply a control signal to said power control means.

25. The combination of claim 22 further characterized by said means to translate force to pressure including a piston member and cylinder member in sliding engagement operably interconnected between said tractor and said trailer, fluid disposed between said members, and fluid sealing means between said members, whereby force between said members in the direction of their sliding engagement will produce a proportional pressure in the fluid contained between said members.

26. The device of claim 25 further characterized by said fluid between said cylinder members and said piston member being operably connected to pneumatic spring means whereby the shock loads between said members are absorbed.

27. The device of claim 24 further characterized by said means to translate pressure to movement including a cylinder, a piston slidably disposed in said cylinder, biasing means interposed between said piston and said cylinder, pressure conducting mean interconnecting said means to translate force to pressure and said cylinder adapted to transmit a pressure signal to said cylinder and urge the piston against said biasing means whereby piston movement is proportional to the pressure signal, said means responsive to the means to translate pressure to movement including a valve adapted to supply a control signal to said power control means, a control beam pivotally mounted intermediate its ends to said piston and adapted to operate said valve.

28. The device of claim 27 further characterized by said control beam including adjusting means to vary the position of the valve with respect to the piston.

29. The combination of claim 5 characterized by means operably connected to said means responsive to said force sensing means to selectively vary the force level maintained between said guiding vehicle and said guided vehicle.

30. The combination of claim 6 characterized by means operably connected to said means responsive to said force sensing means to selectively vary the force level maintained between said guiding vehicle and said guided vehicle.

31. The combination of claim 1 wherein said means responsive to said force sensing means includes means to generate the control signal as a fluid pressure signal.

32. The combination of claim 3 wherein said means responsive to said force sensing means includes means to generate the control signal as a fluid pressure signal.

33. The combination of claim 5 wherein said means responsive to said force sensing means includes means to generate the control signal as a fluid pressure signal.

34. The combination of claim 6 wherein said means responsive to said force sensing means includes means to generate the control signal as a fluid pressure signal.

35. The combination of claim 10 wherein said means responsive to said force sensing means includes means to generate the control signal as a fluid pressure signal.

References Cited by the Examiner
UNITED STATES PATENTS

| | | | |
|---|---|---|---|
| 1,942,637 | 1/1934 | Best | 180—14 |
| 2,599,814 | 6/1952 | Cull | 74—687 |
| 2,688,049 | 8/1954 | Ebert | 74—687 |
| 2,922,481 | 1/1960 | Hutter et al. | 180—14 |

LEO FRIAGLIA, *Primary Examiner.*

A. HARRY LEVY, *Examiner.*

UNITED STATES PATENT OFFICE
CERTIFICATE OF CORRECTION

Patent No. 3,227,235　　　　　　　　　　　　　　　　January 4, 1966

Tadeusz Budzich et al.

It is hereby certified that error appears in the above numbered patent requiring correction and that the said Letters Patent should read as corrected below.

Column 6, line 37, for "of in" read -- on pin --; column 14 line 10, strike out "said guiding vehicle and".

Signed and sealed this 1st day of August 1967.

(SEAL)
Attest:

EDWARD M. FLETCHER, JR.　　　　　　　　　　　EDWARD J. BRENNER
Attesting Officer　　　　　　　　　　　　　　　　Commissioner of Patents